United States Patent [19]

Deshpande et al.

[11] Patent Number: 5,565,142

[45] Date of Patent: Oct. 15, 1996

[54] PREPARATION OF HIGH POROSITY XEROGELS BY CHEMICAL SURFACE MODIFICATION.

[76] Inventors: Ravindra Deshpande, 51 Michelle Dr. Apt. A 11, Lancaster, Pa. 17603; Douglas M. Smith, 1412 Marquette Pl. NE.; C. Jeffrey Brinker, 14 Eagle Nest Dr. NE., both of Albuquerque, N.M. 87122

[21] Appl. No.: 55,069

[22] Filed: Apr. 28, 1993

Related U.S. Application Data

[63] Continuation-in-part of Ser. No. 861,057, Apr. 1, 1992, abandoned.

[51] Int. Cl.$^6$ .............................. B01J 13/00; B05D 7/00; C03C 17/30; E04B 1/74
[52] U.S. Cl. ................ 252/315.2; 252/62; 252/315.6; 252/315.7; 423/338; 427/220; 428/405; 501/12
[58] Field of Search .................... 252/315.2, 315.6, 252/315.7, 62; 427/220; 501/12; 423/338; 428/405

[56] References Cited

U.S. PATENT DOCUMENTS

| | | | |
|---|---|---|---|
| 2,765,242 | 10/1956 | Alexander et al. | 252/315.2 X |
| 2,978,298 | 4/1961 | Wetzel et al. | 252/315.6 X |
| 2,993,809 | 7/1961 | Bueche et al. | 427/220 |
| 3,210,273 | 10/1965 | Taulli | 252/315.2 X |
| 3,346,507 | 10/1967 | Taulli | 252/315.2 |
| 3,803,046 | 4/1974 | Winyall et al. | 252/315.6 |
| 3,963,627 | 6/1976 | Cottrell | 252/315.2 X |
| 4,017,528 | 4/1977 | Unger et al. | 556/457 |
| 4,316,807 | 2/1982 | McDaniel et al. | 252/315.2 X |
| 4,447,345 | 5/1984 | Kummermehr et al. | 252/62 |
| 4,950,635 | 8/1990 | Williams et al. | 428/405 X |
| 5,110,784 | 5/1992 | Williams et al. | 428/405 X |

OTHER PUBLICATIONS

Fred W. Billmeyer,Jr.: *Textbook of Polymer Science*, Third Edition (1984) pp. 448–450.

*Primary Examiner*—Richard D. Lovering

[57] ABSTRACT

This invention provides an extremely porous xerogel dried at vacuum-to-below supercritical pressures but having the properties of aerogels which are typically dried at supercritical pressures. This is done by reacting the internal pore surface of the wet gel with organic substances in order to change the contact angle of the fluid meniscus in the pores during drying. Shrinkage of the gel (which is normally prevented by use of high autoclave pressures, such that the pore fluid is at temperature and pressure above its critical values) is avoided even at vacuum or ambient pressures.

11 Claims, 3 Drawing Sheets

PREPARATION OF HIGH POROSITY XEROGELS BY CHEMICAL SURFACE MODIFICATION.

This is a continuation-in-part application of application Ser. No. 07/861,057, filed on Apr. 1, 1992, now abandoned.

FIELD OF THE INVENTION

This invention is in the field of extremely porous materials such as aerogels and more particularly to aerogels and processes for making aerogels having ultra-fine microstructure and extraordinary properties such as very high insulation qualities. Xerogels are made by the removal of fluid from a fluid-containing gel when the solvent is removed by evaporation and normally exhibit a lower amount of porosity.

BACKGROUND OF THE INVENTION

Aerogels and xerogels are extremely porous materials representing the lower end of the density spectrum of man-made materials. Densities as low as 0.003 g/cm$^3$ have been reported for silica aerogels [L. W. Hrubesh, Chemistry and Industry, 24 (1990) 824]. These fascinating materials have numerous unique properties as a result of their ultra-fine microstructure. Aerogels with the porosities in the range of 0.85 to 0.98 may be transparent and translucent. The porosity is defined as the fraction of the sample volume which is pores. Aerogels exhibit strong Rayleigh scattering in blue region and very weak in red region. In the infrared (IF) region of electromagnetic spectrum, the radiation is strongly attenuated by absorption leading to application in radioactive diode systems, which effectively transmit solar radiation but prevent thermal IR leakage [J. Fricke and R. Caps in Ultrastructure Processing of Advanced Ceramics: ed. J. D. Mackenzie and D. R. Ulrich (Wiley, New York, 1988)]. Unusual acoustic properties (sound velocity as low as 100 m/s) suggests use in impedance matching and other acoustic applications. Aerogels with a refractive index of 1.015 to 1.06 cover the region not occupied by any gas or solid resulting in applications in high energy physics.

Silica aerogels with their thermal conductivities as low as 0.02 W/mK (0.01 W/mK when evacuated) find application in superinsulation systems [J. Fricke in Sol-Gel Technology for Thin Films, Fibers, Performs, Electronics and Speciality Shapes: Ed. L. C. Klein (Noyes Publications, Park Ridge N.J., 1988)]. Fricke has described several aerogel applications based on their insulating properties. They include reduction of heat losses through windows, energy-effective greenhouses, translucent insulation for solar collectors, and solar ponds for long-term energy storage. Fricke has also discussed the mechanism for thermal transport through aerogel tiles and the efforts of density and gas pressure on their thermal conductivity.

Since aerogels are made by sol-gel processing, their microstructure may be tailored to optimize properties desired for specific applications. Various precursors, including metal alkoxides, colloidal suspensions, and a combination of both under several mechanisms of gelation may be used to synthesize gels [C. J. Brinker and G. W. Scherer, Sol-Gel Science (Academic Press, San Diego, 1990)]. By varying aging conditions such as time, temperature, pH, and pore fluid, the parent wet gel microstructure may be altered [P. J. Davis, C. J. Brinker and D. M. Smith, Journal of Non-Crystalline Solids; P. J. Davis, C. J. Brinker, D. M. Smith and R. A. Assink, Journal of Non-Crystalline Solids; R. Deshpande, D. W. Hua, C. J. Brinker, and D. M. Smith, Journal of Non-Crystalline Solids]. In addition to metal oxide gels such as silica, aerogels may be made from wet precursor gels which contain both inorganic and organic components or from organic gels. For the composite gels, the organic and inorganic phases may be mixed on different length scales such that the organic component resides solely on the internal pore surface, is incorporated into the spanning gel structure, or forms a separate (from the inorganic phase) gel structure.

The conversion of the wet gel to a dried aerogel or xerogel requires the removal of large quantities of solvent. As solvent is removed, the gel tends to shrink as a result of capillary pressure. The capillary pressure generated during drying is related to the pore fluid surface tension, $y_{LV}$, and contact angle, $\theta$, between the fluid meniscus and pore wall as follows, $$P_c = -(2 y_{LV} \cos\theta)/r \qquad (1)$$

where r is the pore radius. For submicron capillaries, such as in silica gels, very large stresses are developed during drying. Aerogel synthesis involves the reduction of capillary pressure by lowering the surface tension, $y_{LV}$, to avoid shrinkage of the wet gel during drying.

Aerogels are not new materials. They were first reported by Kistler almost 60 years ago [S. S. Kistler, Nature, 127 (1931) 741]. However, recent advances in sol-gel processing technology along with increasing environmental concern have regenerated interest in energy conservation and alternate thermal insulation applications. The most common method of making aerogels involves directly removing the pore fluid above its critical point (for ethanol $T_c=243°$ C., $P_c=63$ bar). The critical point is a chemical specific point on the pressure-temperature phase diagram and at temperature and pressure above the critical point values, a liquid and gas cannot coexist but rather, a supercritical fluid will. This avoids liquid-vapor menisci and thus, capillary stresses during drying and essentially preserves the wet gel structure. An alternate low temperature method involves replacing the pore fluid with liquid $CO_2$ and then removing $CO_2$ above its critical point ($T_c=31°$ C., $P_c=73$ bar). All of these prior approaches require high pressure supercritical processing to reduce shrinkage.

Although aerogels exhibit very unique properties, they suffer from several drawbacks for commercial applications. An important disadvantage is their high processing cost because of the need for high pressures associated with supercritical drying of monoliths which require large autoclaves. For the high temperature process significant chemical and physical changes in gel structure can occur as a result of the greatly accelerated rates of aging and changes in the equilibrium behavior of various reactions whereas the low temperature carbon dioxide exchange process is limited to certain pore fluids, since they must be miscible in liquid $CO_2$.

SUMMARY OF THE INVENTION

This invention involves the production of a material which has the properties of a supercritically dried aerogel but with a non-supercritical process. By treating either inorganic metal oxide gels of the general formula $M_xO_y$ such as silica ($SiO_2$) and alumina ($Al_2O_3$), composite inorganic-organic gels of the general formula $R_xM_yO_z$, or organic gels, in the wet state before drying with surface modification agents or compounds of the form $R_xMX_y$ where R are organic groups such as $CH_3$, $C_2H_5$, etc. and X is a halogen, usually Cl, so that significant changes in the subsequent drying of the gels at non-supercritical pressures are obtained which leads to greatly reduced shrinkage during drying.

The presence of the organic groups on the internal surface of the pores and the proper selection of the final solvent from which the gel is dried results in a contact angle of the fluid in the pore of near 90°. This reduces the capillary pressure to near zero (see Equation 1). Thus, in contrast to high pressure supercritical drying which manipulates the surface tension of the pore fluid to lower capillary pressure during drying, the arrangement of this invention changes the contact angle to lower capillary pressure. The process consists of a series of aging, washing, and/or surface modification steps which are undertaken upon a wet gel before drying. In one embodiment of the invention, water in the water/alcohol mixture initially contained in the wet gel is removed by solvent exchange with either a protic (i.e. alcohol) or aprotic (i.e., acetone) solvent to remove water. The wet get is then placed in a mixture of the surface modification compound ($R_xMX_y$) and a solvent in which it is soluble such as benzene or toluene. After reaction, the gel is again washed with a protic or aprotic solvent and the gel is dried at sub-critical pressure (e.g., vacuum to ambient to sub-critical pressure). Sub-critical is defined as any pressure less than the critical pressure for the fluid, $P_c$. In this manner, high porosity (0.60<porosity) and low density (density<0.3 g/cm$^3$) ambiently dried gels (xerogels) are obtained with properties essentially the same as supercritically-dried aerogels.

BRIEF DESCRIPTION OF THE DRAWINGS

Reference is now made to the drawings in which

FIG. 6 is a graph showing hexane imbibition into dried gels with the same pore size. The much slower rate of imbibition for the surface modified gel demonstrates the lower capillary pressure and contact angle closer to 90°.

DETAILED DESCRIPTION OF THE INVENTION

In accordance with the invention inorganic metal oxide gels such as silica ($SiO_2$) and alumina ($Al_2O_3$) and of the general formula $M_xO_y$, or inorganic-organic composite gels of the formula $R_xM_yO_z$ or organic gels are treated in the wet state before drying with a suitable surface modification compound. Such compound may take the form $R_xMX_y$ where R are organic groups such as $CH_3$, $C_2H_5$, etc. and X is a halogen, usually Cl. In accordance with the invention, the surface modification compound greatly reduces shrinkage during drying. As described earlier, capillary pressure causes the gel to collapse during drying.

By decreasing the magnitude of the capillary pressure, less shrinkage is obtained during drying. Because the surface area of wet gels is very high (10–2000 m$^2$/g), a significant fraction of the atoms in the gel will be surface species. For a metal oxide gel, the surface will be terminated with either hydroxyl (OH) or alkoxy (OR) groups. In prior art drying processes, these surface groups react to produce MOM bonds via water producing condensation (MOH+MOH<–>MOM+H$_2$O) or alcohol producing (MOH+MOR<–>MOM+ROH) reactions. These MOM bonds thus retain the structure of the collapsed wet gel and, disadvantageously, do not allow the gel to expand after the capillary pressure is released, i.e., the gel is dried. In accordance with the invention by capping these surface MOH and MOR surface groups with surface modification compounds of the form $R_xMX_y$, the surface becomes covered with unreactive $MR_x$ groups. Advantageously, the unreactive $MR_x$ groups increase the contact angle of the fluid meniscus in the pores of the wet gel and prevent condensation reaction during drying. While surface modification groups have previously been employed to modify the surface properties of material to make them hydrophobic, such groups are employed in this invention for a much different purpose—they are used to modify the contact angle of the fluid meniscus in the pores during drying to minimize shrinkage of the gel.

The process used in accordance with the invention consists of a surface modification step which is undertaken upon a wet gel before drying. The wet gel may be produced via hydrolysis and condensation of metal alkoxides, gelling of particulate or colloidal metal oxides, gelation of organic precursors, or a composite of these approaches. A series of aging steps to increase wet gel strength and washing steps to remove water from the wet gel since water reacts with the surface modification compound, may be used before the surface modification step.

Figure 1A:
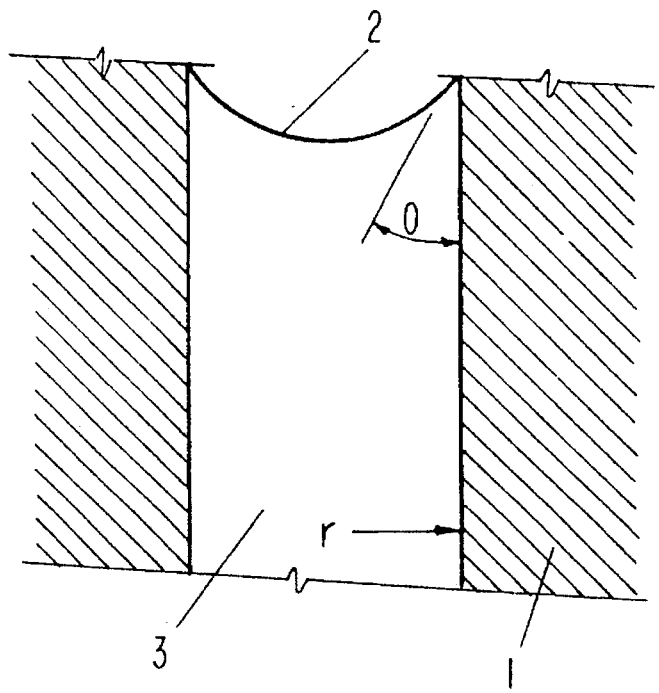
FIG. 1 is a schematic diagram of fluid contained in a pore. Depending upon the fluid and the surface modification of the pore wall, the degree of wetting changes which causes a significant change in the fluid meniscus shape and hence, magnitude of capillary pressure.
Figure 1B:
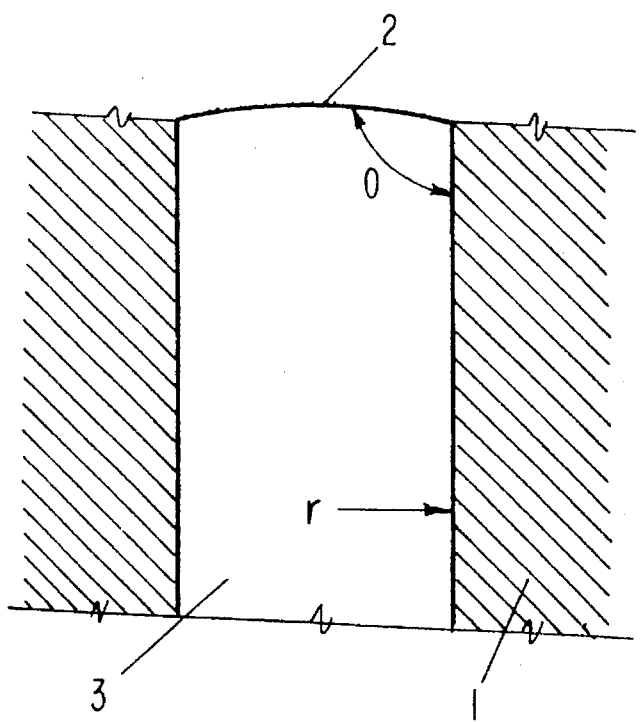

If water is contained in the wet gel, it may be removed by solvent exchange with either a protic (i.e. alcohol) or aprotic (i.e., acetone, hexane) solvent. The wet gel is then placed in a mixture of the surface modification compound ($R_xMX_y$) and a solvent in which the surface modification compound is soluble and which is miscible with the solvent in the gel. A wide range of solvents such as benzene, toluene, and hexane may be used. The surface modification compound reacts with hydroxyl groups on the surface as: (eg. $R_3$MCl+MOH→MOMR$_3$+HCl). After the reaction is completed, the gel is again washed with a protic or aprotic solvent and the gel is dried at pressures less than the critical point (vacuum to sub-critical pressure) and typically at ambient pressure. As a consequence of the surface modification, the wetting angle θ is much larger and the meniscus shape is flatter as shown in FIG. 1. This results in significantly lower capillary pressure during drying than would exist for a gel not modified in accordance with the invention. As a result of the lower capillary pressure, little linear shrinkage occurs during drying. The small degree of shrinkage (less than 5% of the sample length) results in low density, high porosity dried gels. For a gel not modified in accordance with the invention, the linear shrinkage under the same drying conditions would exceed 30%. In this manner, in accordance with the invention high porosity (0.60<porosity<0.95) low density (0.1<density<0.3 g/cm³) dried gels (xerogels) are obtained with properties essentially the same as supercritically-dried aerogels. Specific processes and the resultant dried gel properties in accordance with embodiments of the invention are illustrated in the following Examples.

---

EXAMPLE #1 Surface Modification and Drying of Alkoxide-derived Silica gel: Complete Washing Before Modification Silica gel via two-step base catalysis of TEOS (B2 gel)

Step 1: TEOS stock solution preparation tetraethylorthosilicate (TEOS), ethanol, water, and HCL acid in the molar ratio 1:3:1:0.0007 under constant reflux for 1.5 hours at 333 K.
i.e. 61 ml TEOS
61 ml Ethanol
4.87 ml Water
0.2 ml 1M HCL acid.

Step 2: 10 Ml of TEOS stock solution was gelled by adding 1 ml of 0.05M $NH_4OH$. Gelation occurred at approximately 1.5 hours at 310 K in glass bottles.

Aging and Washing

1) After gelation the sample was aged 22 hours at 310 K.
2) Samples were washed 5 times with excess (approx. 10 times the volume of gel samples) absolute ethanol at 310 K. Each washing cycle was 24 hours each.

Surface Modification and Washing

1) Surface modification using trimethylchlorosilane (TMCS) where R is $CH_3$, x is 3, M is Si, X is Cl, and y is 1. Surface modification of the ethanol washed samples was carried out by shaking these samples with an excess amount of 10 volume % TMCS in Benzene for 48 hours at room temperature.
2) Unreacted surface modification compound was removed by washing the gels with an excess amount of an aprotic solvent. This was achieved by shaking the samples with the solvent for 48 hours at room temperature. Different solvents used at this step were as follows:

| ID | Aprotic (Surface Tension, dyne/cm) |
| --- | --- |
| 115C | THF (23.1) |
| 115D | Acetone (23.7) |
| 115E | Benzene (29) |
| 115F | Acetonitrile (29.3) |
| 115G | 1:4 Dioxane (33.6) |

Drying

1) Excess aprotic solvent was drained and samples were dried at ambient pressure for 24 hours at room temperature followed by at 323 K and 373 K for 24 hours each.

| Surface Tension (dyne/cm) | Surface Area ($m^2/g$) | Pore Vol. ($cm^3/g$) | Porosity | Av. Pore Radius (nm) |
| --- | --- | --- | --- | --- |
| 23.1 | 869.4 | 2.259 | 0.82 | 5.95 |
| 23.7 | 843.7 | 2.23 | 0.82 | 5.28 |
| 29.0 | 850.3 | 2.23 | 0.82 | 5.24 |
| 29.3 | 837.1 | 2.25 | 0.82 | 5.37 |
| 33.6 | 826.9 | 2.62 | 0.84 | 6.33 |

End of Example #1

---

EXAMPE #2 Surface Modification and Drying of Alkoxide-derived Silica gel: Drying from Acetone Wet Silica gel via two-step base catalysis of TEOS (B2 gel)

Step 1: TEOS stock solution preparation tetraethylorthosilicate (TEOS), ethanol, water, and HCl acid in the molar ratio 1:3:1:0.0007 under constant reflux for 1.5 hours at 333 K.
i.e. 61 ml TEOS
61 ml Ethanol
4.87 ml Water
0.2 ml 1M HCl acid.

| Step 2: | 10 ml of TEOS stock solution was gelled by adding 1 ml of 0.05M NH₄OH. Gelation occurred at approximately 1.5 hours at 310 K in plastic cylindrical molds. |

Aging and Washing

1) After gelation the sample was aged 22 hours at 310 K, followed by 24 hour aging at 323 K.
2) The sample was washed once with excess (approx. 10 times the volume of gel samples) Acetone at 310 K. Each washing cycle was 24 hours.

Surface Modification and Washing

1) Surface modification using trimethylchlorosilane (TMCS) where R is $CH_3$, x is 3, M is Si, X is Cl, and y is 1. Surface modification of acetone washed sample was carried out by shaking these samples with excess amount of 10 volume % TMCS in Benzene for 48 hours at room temperature.
2) Unreacted surface modification compound was removed by washing the gel with an excess amount of an aprotic solvent. This was achieved by shaking the samples with the solvent for 48 hours at room temperature. One solvent used at this step was:

| ID | Aprotic (Surface Tension, dyne/cm) |
|---|---|
| 756-11 | THF (23.1) |

Drying

1) Excess aprotic solvent was drained and the sample was dried at ambient pressure for 24 hours at room temperature followed by at 323 K and 373 K for 24 hours each.

Results

Surface area = 851.6 $m^2/g$
Pore volume = 4.14 $cm^3/g$ (Measured via bulk and skeletal density)
Porosity = 0.89
Average pore radius = 9.72 nm End of Example #2

EXAMPLE #3 Surface Modification of Particulate Silica gel/Drying from Aprotics

Particulate Silica Gel Preparation

Silica gel was prepared by changing the pH of a solution of particulate silica to approx. 5.5 by addition of HCl acid. Solutions containing 40 wt % silica (Ludox) in water gelled in approx. 1 hour while 32% wt % silica solutions gelled in approx. 1.5 hours.

Aging and Washing

1) After gelation the sample was aged 22 hours at 310 K, followed by 24 hour aging at 323 K.
2) Samples were washed once with excess (approx. 10 times the volume of gel samples) Acetone at 310 K. Each washing cycle was 24 hours.

Surface Modification and Washing

1a) Surface modification using trimethylchlorosilane (TMCS) where R is $CH_3$, x is 3, M is Si, X is Cl, and y is 1. Modification of Acetone washed samples was carried out by shaking these samples with an excess amount of 10 volume % TMCS in Benzene for 48 hours at room temperature.
1b) Surface modification using trichloromethylsilane (TCMS) where R is $CH_3$, x is 1, M is Si, X is Cl, and y is 3. Modification of Acetone washed samples was carried out by shaking these samples with an excess amount of 10 volume % TCMS in Benzene for 48 hours at room temperature.
2) Unreacted surface modification compound was removed by washing the gels with excess amounts of an aprotic solvent. This was achieved by shaking the samples with the solvents for 48 hours at room temperature. The aprotic solvent used at this stage was n-hexane.

Drying

1) Excess aprotic solvent was drained and the samples were dried at ambient pressure for 24 hours at room temperature followed by at 323 K and 373 K for 24 hours each.

Results

Porosity = 0.8

End of Example #3

Example #4 Organic-Inorganic Composite Gel by the Substitution of a Gel Structure Modifier for Tetraethyl orthosilicate: Organic Phase on Pore Surface Preparation of wet gel by two-step base-catalysis of TEOS and MTEOS Step 1: TEOS stock solution was modified by the partial substitution of methyltriethoxysilane (MTEOS) for tetraethylorthosilicate (TEOS). Two stock solutions were prepared, regular TEOS stock solution and 50/50 TEOS/MTEOS. Preparation of the MTEOS stock solution consists of using a ratio of TEOS/MTEOS equal to 0.5 based on the amount of Si. TEOS, MTEOS, Ethanol, water, and HCl acid in the molar ratios of 1:1:8:2:0.0014 were refluxed for 4 hours at 333 K.
i.e. 30.5 ml TEOS
27.3 ml MTEOS
64.2 ml Ethanol
4.87 ml Water
0.2 ml 1M HCl Step 2: Different percentages of the MTEOS gels were prepared by mixing different ratios of the TEOS stock solution and MTEOS stock solution.

| % Modified Ester | TEOS stock | 50/50 Stock |
| --- | --- | --- |
| 10 | 8 | 2 |
| 20 | 6 | 4 |
| 30 | 4 | 6 |
| 40 | 2 | 8 |
| 50 | 0 | 10 |

Step 3: 10 ml of the modified stock solution was gelled by adding 1 ml of 0.5M $NH_4OH$. Gelation occurred in the range of 30 minutes to 10 hours in plastic cylinders at 310 K. Gelation time increased with increasing modification with MTEOS.

Aging and Washing

1) After the samples were gelled at 310 K they were aged at 323 K for 24 hours.
2) The samples were washed three times in three hours with excess absolute ethanol at 323 K, followed by two washings with hexane in two hours. After the second hexane wash, the samples were kept at 323 K for 24 hours in hexane.

Surface Modification and Washing

1) Surface modification was carried out by immersing the wet gel in a 5 vol. % Trimethylchlorosilane in hexane for 24 hours at 323 K.
2) Unreacted TMCS was removed after 24 hours by washing the gel an additional two times with hexane.

Drying

1) Excess hexane was drained and the gel was dried at 310 K, 323 K, and 413 K for 24 hours each.

Results

| % Modified Ester | Bulk Density (g/cc) |
| --- | --- |
| 20 | 0.18 |
| 50 | 0.21 |

End of Example #4

Example #5 Organic-Inorganic Composite Gel by the Substitution of a Gel Structure Modifier for Tetraethyl orthosilicate: Organic Phase Incorporated in Gel Bridging Structure Preparation of wet gel by two-step base catalysis of TEOS and BTMSE Step 1: TEOS stock solution was modified by the partial substitution of 1,2-Bis(trimethoxysilyl)ethane (BTMSE) for tetraethylorthosilicate (TEOS). Two stock solutions were prepared, 50/50 BTMSE stock solution consists of using a ratio of TEOS/BTMSE equal to 0.5 based on the amount of Si. TEOS, BTMSE, Ethanol, water, and HCl acid in the molar ratios of 1:0.5:6:2:0.0014 were refluxed for 4 hours at 333 K. The 100% BTMSE was calculated using the same molar ratio of Si as in normal 15% TEOS stock solution. BTMSE, Ethanol, Water, and HCl in the molar ratios of
1:6:2:0.0014 were refluxed for 4 hours at 333 K.

i.e. 50/50 BTMSE/TEOS100 BTMSE

| 30.50 ml TEOS | 34.28 ml BTMSE |
|---|---|
| 17.13 ml BTMSE | 87.72 ml Ethanol |
| 74.37 ml Ethanol | 4.87 ml Water |
| 4.87 ml Water | 0.2 ml 1M HCl |
| 0.2 ml 1M HCl | |

Step 2: Different percentages of the BTMSE gels were prepared by mixing different ratios of the 50/50 TEOS/BTMSE stock solution and BTMSE stock solution.

| % Modified Ester | 50/50 Stock | BTMSE stock |
|---|---|---|
| 50 | 10 | 0 |
| 60 | 8 | 2 |
| 70 | 6 | 4 |
| 80 | 4 | 6 |
| 90 | 2 | 8 |
| 100 | 0 | 10 |

Step 3: 10 ml of the modified stock solution were gelled by adding 1 ml of 0.5M NH$_4$OH. Gelation occurred in the range of one hour to 12 hours in plastic cylinders. Gelation time increased with increasing modification with BTMSE.

Aging and Washing

1) After the samples were gelled at 310 K they were aged at 323 K for 24 hours.
2) The samples were washed three times in three hours with excess absolute ethanol at 323 K, followed by two washings of hexane in two hours. After the second hexane wash, the samples were kept at 323 K for 24 hours in hexane.

Surface Modification and Washing

1) Surface modification was carried out by immersing the gel in a 5 vol. % Trimethylchlorosilane in hexane for 24 hours at 323 K.
2) Unreacted TMCS was removed after 24 hours by washing the gel an additional two times with hexane.

Drying

1) Excess hexane was drained and the gel was dried at 310 K, 323 K, and 413 K for 24 hours each.

| % Modified Ester | Bulk Density (g/cc) |
|---|---|
| 50 | 0.26 |
| 60 | 0.27 |
| 70 | 0.27 |
| 80 | 0.29 |
| 90 | 0.32 |
| 100 | 0.32 |

End of Example #5

The dried gels were characterized by conventional porous material analysis techniques including BET analysis of nitrogen adsorption isotherms at 77K (surface area), analysis of the desorption branch of the nitrogen isotherm (pore size distribution), the difference between the bulk and skeletal densities and/or the total volume of nitrogen condensed at high relative pressure (total pore volume), and the drying characteristics (weight loss and sample length change). The pore volume ($V_p$, the total pore volume per mass of the dried gel) is related to the porosity ($\epsilon$, the fraction of the total material volume which is porous) by $\epsilon=V_p/(V_p+1/\rho_t)$ where $\rho_t$ is the skeletal density of the solid matrix which is usually measured via helium displacement. For silica gels, $\rho_t$ is approximately 2 g/cm$^3$ and thus, a pore volume of 2 cm$^3$/g corresponds to a solid which is 80% air and a pore volume of 4.5 cm$^3$/g corresponds to a solid which is 90% air.

Figure 2:
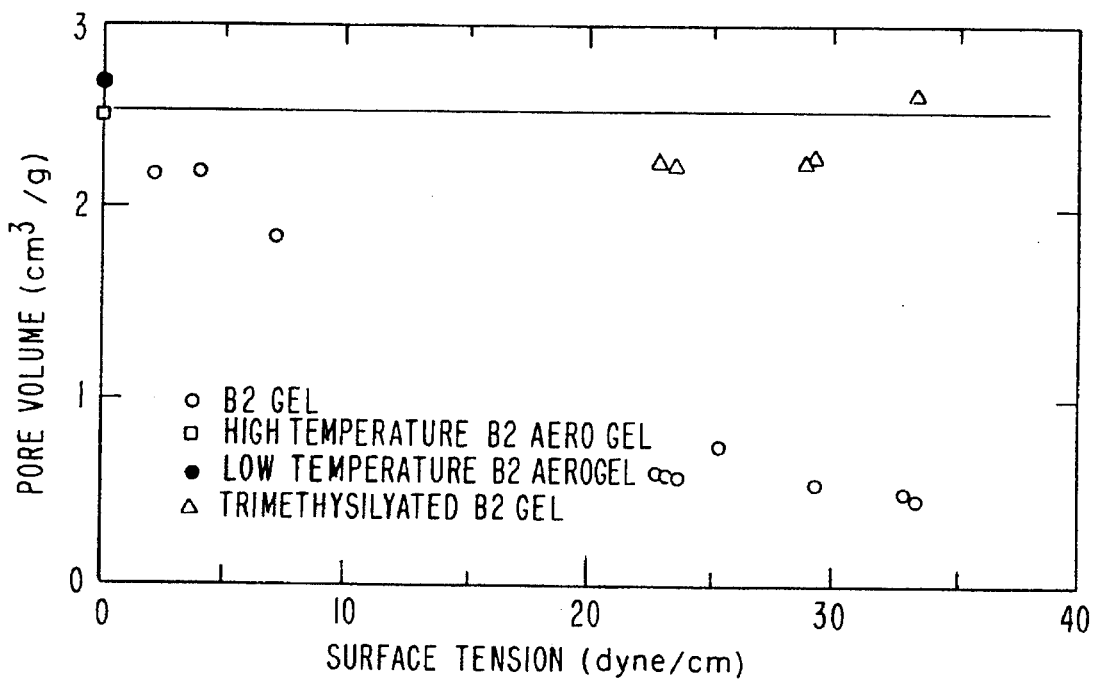
FIG. 2 is a graph depicting variation of pore volume with final pore fluid surface tension for conventional high temperature (ethanol) and low temperature (carbon dioxide) supercritically-dried aerogels, for conventional xerogels dried from pore fluids of different surface tensions, and the ambient pressure, surface modified gels processed in accordance with an embodiment of the invention.
Figure 3:
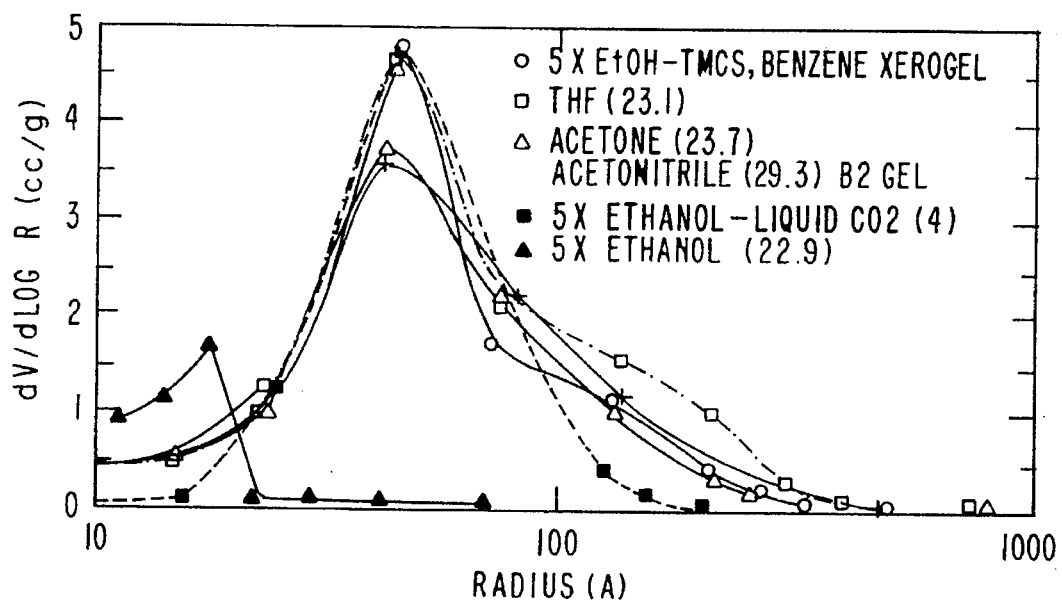
FIG. 3 is a graph showing a comparison of the pore size distributions obtained for dried gels processed using the surface modification, ambient pressure processing in accordance with the invention and xerogels which were not surface modified and dried from different solvents.

The pore volume for a number of silica gels made using the B2 silica gel recipe described above are shown in FIG. 2 and were: 1) surface modified and dried from a variety of solvents at ambient pressure (Example #1), 2) dried from solvents without surface modification at ambient pressure (conventional xerogel process), 3) supercritically dried without surface modification at high temperature from ethanol (conventional aerogel process), and 4) supercritically dried without surface modification at low temperature from carbon dioxide (conventional aerogel process). The pore volumes for the surface modified gels are independent of surface tension and essentially equal to the two different aerogel samples. The pore size distribution for several of the surface modified gels in accordance with the invention is presented in FIG. 3 and shows the same lack of dependence on surface tension. For comparison, two unmodified gels are included to show the collapse (i.e., decrease in pore size) that would normally occur during conventional drying. Nomeally, as a gel is dried, it undergoes a monotonic decrease in size.

Figure 4:
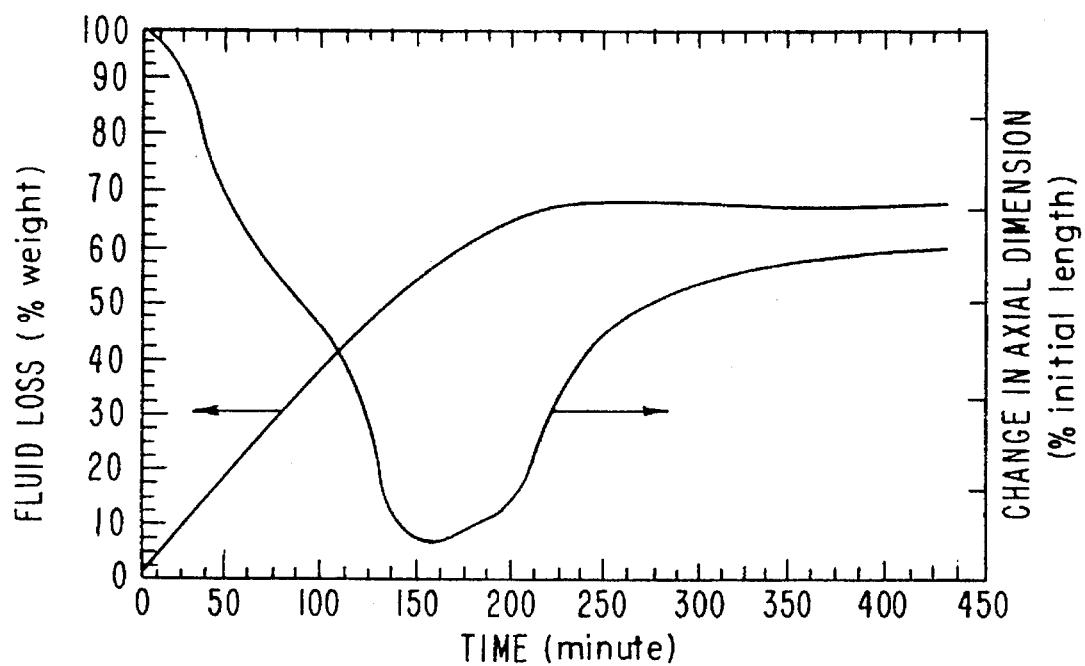
FIG. 4 is a graph showing a change in sample weight and sample length during drying for surface modified, ambient pressure gel processed in accordance with the invention, illustrating the initial shrinkage followed by expansion of the gel during the final stages of drying.
Figure 5:
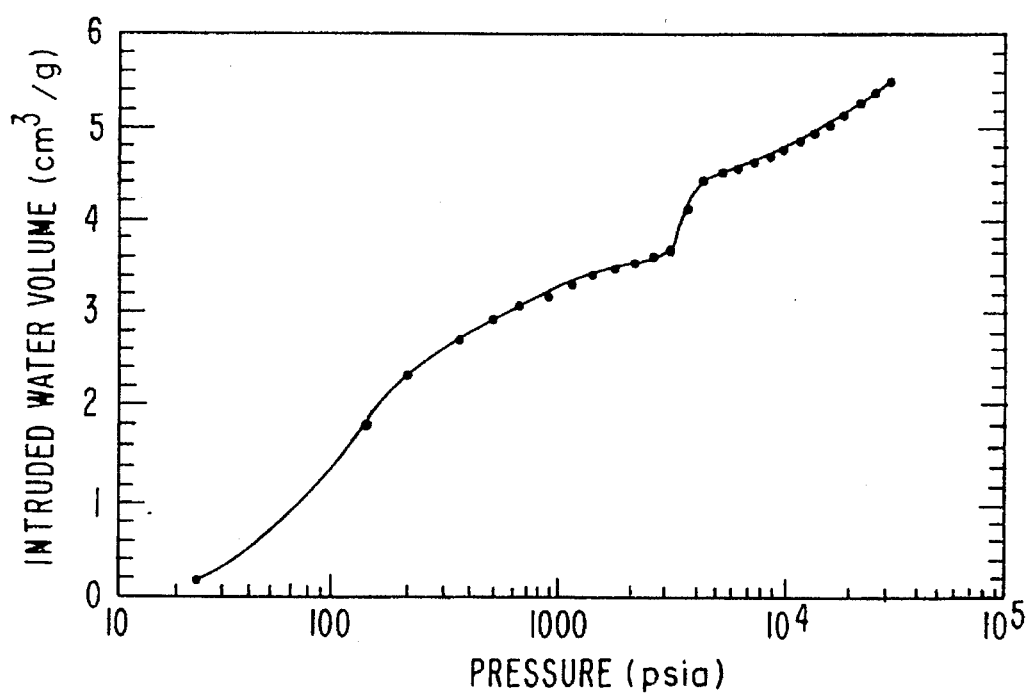
FIG. 5 is a graph showing water intrusion illustrating the hydrophobic nature of surface modified gels, described in Example 1, in accordance with the invention.

However, by capping the surface sites in accordance with the invention, our process actually results in a expansion during the final stages of drying as shown in FIG. 4. In carrying out processing in accordance with the invention, the degree of this shrinkage and subsequent recovery in sample size is a function of the surface tension of the fluid and fluid-pore wall contact angle. After surface modification, the gels are hydrophobic as compared to conventional gels which are hydrophillic. This is illustrated in FIG. 5. A significant external pressure is required to force water into the pores of the surface modified, ambient pressure gels. For a conventional unmodified aerogel or xerogel, water would rapidly wick into the gel at ambient pressure destroying its mechanical and insulating properties.

In order to demonstrate that the capillary 2pressure in surface modified gels made via this process have a lower capillary pressure during drying, imbibition experiments were performed on both modified and unmodified samples. In this experiment, a dried gel is brought into contact with the fluid. The fluid wicks into the dried gel due to capillary pressure. From the rate of uptake, the contact angle is determined. FIG. 6 is a plot of imbibition uptake curves for n-hexane. If the contact angle for both samples was the same, the slopes of the curves would match. The final height is different for the samples because different sample lengths were employed. Contact angles for four different fluids and both modified and not modified gels are shown in Table 1. The contact angle is consistently nearer to 90° (lower capillary pressure) for the surface modified gels.

TABLE 1

Contact angles for surface modified gels dried at ambient pressure and unmodified gels dried using supercritical processing.

| Fluid | Surface Modified (ambient pressure) | Not Surface Modified (supercritical) |
|---|---|---|
| ethanol | 76.7°, 78.4° | 30.3°, 35.1° |
| acetone | 79.3°, 77.2° | 29.1°, 37.2° |
| hexane | 89.6°, 82.7° | 41.3°, 48.4° |
| 1:4 dioxane | 81.1° | 66.4° |

Accordingly, it is seen that the invention advantageously provides an extremely low density finely pored gel through an inexpensive process not requiring high pressure, having beneficial and useful insulating and other properties.

We claim:

1. The method of producing a xerogel of porosity greater than about 0.6 comprising the steps of:

a) preparing a wet gel containing water, said gel having a pore fluid contact angle $\Theta$ and a substantial number of its atoms which are surface species, by at least one process selected from the group of hydrolysis and condensation of metal alkoxides, gelling of particulate metal oxides, and gelation of organic precursors;

b) exchanging substantially all of the water contained in said wet gel with a protic or aprotic solvent;

c) reacting said wet gel with a surface modification agent $R_xMX_y$, wherein R is an organic group, M is selected from the group consisting of Si and Al, and X is halogen, to cause replacement of a substantial number of surface species with a different species which substantially increases the pore fluid contact angle $\Theta$; and d) drying said wet gel at one or more pressures selected to be within the range from vacuum to sub-critical.

2. The method of claim 1 further including the step of aging the wet gel at an elevated temperature for a predetermined period of up to 46 hours before said step of exchanging.

3. The method of claim 2 wherein the elevated temperature is within the range of ambient to about the boiling point of the water in the wet gel.

4. The method of claim 1 further including, after said step of exchanging, the step of aging the gel at a temperature up to the boiling point of the solvent.

5. The method of claim 1 wherein in said step c) the wet gel is reacted with an organosilane in a selected solvent.

6. The method of claim 5 wherein the selected solvent is an organic solvent.

7. The method of claim 5 wherein said step c) further includes the step of removing unreacted surface modification agent with a protic or an aprotic solvent.

8. The method of claim 1 wherein said step a) includes the step of preparing the gel as a metal oxide gel from a solution of tetraethylorthosilicate (TEOS).

9. The method of claim 1 wherein said step a) includes the step of preparing the gel as a metal oxide gel from a colloidal or particulate silica.

10. The method of claim 1 wherein said step a) includes the step of preparing the gel as a metal oxide gel from an alkoxide or a particulate gel or a combination of both.

11. The method of claim 1 wherein the step of drying is in a range of pressures between vacuum and sub-critical and in a range of temperatures between ambient and the boiling point of the solvent in the wet gel, until the gel does not undergo any further weight loss.

\* \* \* \* \*

UNITED STATES PATENT AND TRADEMARK OFFICE
CERTIFICATE OF CORRECTION

PATENT NO.   : 5,565,142
DATED        : October 15, 1996
INVENTOR(S)  : Deshpande et al It is certified that error appears in the above-indentified patent and that said Letters Patent is hereby corrected as shown below:

Column 1, after line 6, please add the following paragraph:

-- The U.S. Government has a paid-up license in this invention and has the right in limited circumstances to require the patent owner to license others on reasonable terms as provided for by the terms of contract # DE-AC04-76DP00789 awarded by the Department of Energy. --

Signed and Sealed this

Twenty-sixth Day of August, 1997

*Attest:*

*Attesting Officer*

BRUCE LEHMAN

*Commissioner of Patents and Trademarks*